(No Model.) 6 Sheets—Sheet 1.

R. EICKEMEYER, Dec'd.
R. EICKEMEYER, JR., Executor.
RHEOSTAT FOR USE IN ELECTRIC MOTOR CIRCUITS.

No. 550,044. Patented Nov. 19, 1895.

Attest:
Philip F. Larner
Lowell Bartle

Inventor:
Rudolf Eickemeyer
By ———
Attorney

(No Model.) 6 Sheets—Sheet 2.

R. EICKEMEYER, Dec'd.
R. EICKEMEYER, Jr., Executor.
RHEOSTAT FOR USE IN ELECTRIC MOTOR CIRCUITS.

No. 550,044. Patented Nov. 19, 1895.

Attest:
Philip F. Larner
Lowell Bartle

Inventor:
Rudolf Eickemeyer
By ______ Attorney

(No Model.) 6 Sheets—Sheet 3.
R. EICKEMEYER, Dec'd.
R. EICKEMEYER, JR., Executor.
RHEOSTAT FOR USE IN ELECTRIC MOTOR CIRCUITS.

No. 550,044. Patented Nov. 19, 1895.

Attest:
Philip F. Larner
Lowell Bartle

Inventor:
Rudolf Eickemeyer
By ____
attorney (No Model.) 6 Sheets—Sheet 5.
R. EICKEMEYER, Dec'd.
R. EICKEMEYER, JR., Executor.
RHEOSTAT FOR USE IN ELECTRIC MOTOR CIRCUITS.
No. 550,044. Patented Nov. 19, 1895.

(No Model.) 6 Sheets—Sheet 6.

R. EICKEMEYER, Dec'd.
R. EICKEMEYER, Jr., Executor.
RHEOSTAT FOR USE IN ELECTRIC MOTOR CIRCUITS.

No. 550,044. Patented Nov. 19, 1895.

Attest:
Philip F. Larner.
Howell Bartle.

Inventor:
Rudolf Eickemeyer
By ___ Mead
Attorney

UNITED STATES PATENT OFFICE.

RUDOLF EICKEMEYER, OF YONKERS, NEW YORK; RUDOLF EICKEMEYER, JR., EXECUTOR OF SAID RUDOLF EICKEMEYER, DECEASED.

RHEOSTAT FOR USE IN ELECTRIC-MOTOR CIRCUITS.

SPECIFICATION forming part of Letters Patent No. 550,044, dated November 19, 1895.

Application filed January 14, 1893. Serial No. 458,430. (No model.)

*To all whom it may concern:*

Be it known that I, RUDOLF EICKEMEYER, of Yonkers, in the county of Westchester and State of New York, have invented certain new and useful Improvements in Automatically-Controlled Rheostats for Use in Electric-Motor Circuits; and I do hereby declare that the following specification, taken in connection with the drawings furnished and forming a part of the same, is a clear, true, and complete description of my invention.

The said improvements have been devised by me with special reference to their use in connection with electric elevators, either as a substitute for or as an important auxiliary to a certain variety of resistance-controlling devices disclosed by me in Letters Patent No. 454,462, issued to me June 23, 1891. In my said prior elevator organization I employed a resistance slide or switch in the motor-circuit, which was mechanically controlled in putting in resistance while stopping the motor and automatically operated and controlled for cutting out resistance in proportion to the development of counter-electromotive force by the motor, this automatic control being effected by the electric current in the motor-circuit operating magnetically through a solenoid, to the core of which a resistance-brush was connected.

The main object of my present invention is to provide for a gradual automatic cutting out of a desirable proportion of the outside resistance (after the motor-circuit is closed) independently of any control by the electric current, and then to leave the automatic cutting out of the remainder of the resistance subject to electric control, and to further provide that the entire resistance shall be thrown in by means which are controllably accessible on or at the elevator-car, as when stopping the motor. To these ends I have now devised a rheostat having a resistance-slide with a brush or brushes which may be mechanically controlled from an elevator-car, as before, for putting in resistance, but which when the circuit is closed at the main switch commences to mechanically operate in progressively cutting out resistance at a speed which, during its automatic operation, is mechanically self-controlled and capable of graduation to any desired slow speed.

The power relied upon for moving the resistance switching-brush during the cutting-out operation may be gravitation, (as in my aforesaid Letters Patent,) although springs may be used when weighting is undesirable; but in either case I rely upon a mechanically-operating retarding element for securing a slow or gradual progressive cutting-out movement of the resistance-brush. The said retarding element, or "retarder," as it may be properly termed, may be widely varied as to its form, as well as to its specific mode of operation, without departure from certain portions of my invention, it being only essential that as a retarder, in combination with an automatically-operating resistance switch-brush, it will conserve its moving power and secure a sure but gradual cutting-out operation. In other words, said retarder may be a "dash-pot" in several of its well-known forms, whether supplied with air or such liquids as oil, glycerine, or mercury; or said retarder may be similar to any of the various forms of "escapement" well known in connection with clockwork; or said retarder may be of the fan-regulator type common to many organizations for conserving the force of weights and springs, or, finally, the retarder may be of the pressure-brake type when organized so as to be very delicate and reasonably uniform in its operation, although the other forms of retarders will be preferred, because of the greater facility afforded by them for initial automatic operations. In whatever form the retarder may be it need only operate as a retarding or controlling element during the progressive cutting-out movement of the resistance-brush; but if it should not cease to operate during the return movement of the brush it must be capable of being readily overcome by the mechanism which causes said movement, as when an attendant on the elevator-car works the hand-line for stopping the motor and actuates the brush for putting in the resistance preparatory to again starting the motor.

In what I deem as one of its best forms an automatic rheostat or resistance-slide embodying my improvements includes two connected sets of resistances and their contact-blocks, two switch-brushes, each controlling its own predetermined proportion of outside resistance, both being controlled automatically, the one in both cutting-out and putting-in resistance by means of electric current, as when operating through a solenoid, and the other controlled mechanically during the cutting-out operation, but both capable of being actuated simultaneously for putting in all of the resistance by means of mechanism operatively controlled at or on the elevator-car.

In a simpler but efficient embodiment of my invention a single resistance-brush is organized with a solenoid, and also with a mechanically-operating retarder, and in this case the core of the solenoid serves as a weight, under the influence of the retarder, for automatically cutting out a part of the resistances before the solenoid operates as an automatic controlling element with respect of the remainder of the resistance.

The simplest forms of rheostats embodying a portion of my invention include the combination, with a set of resistances, of contact-blocks and a switch-brush operated mechanically in putting in resistance, as when operating a main switch for stopping the motor, and automatically actuated and controlled, both as to movement and speed, in cutting out resistance after the motor has been started.

To more particularly describe my invention, I will refer to the accompanying drawings, in which—

Figure 1:
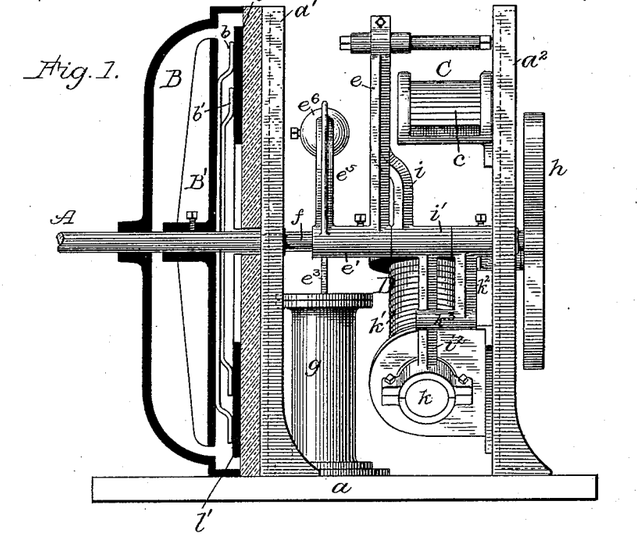
Figure 1 in vertical section illustrates the main portions of a switch-box embodying my improvements in a specially useful form.
Figure 2:
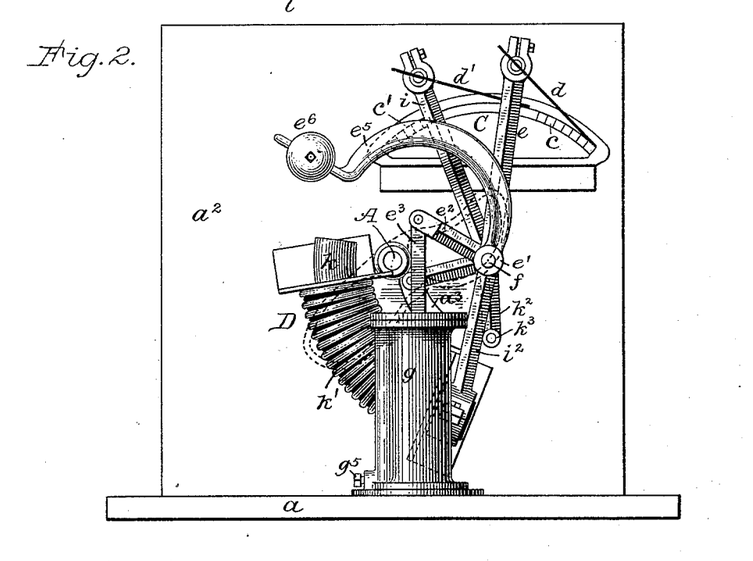
Fig. 2 in side view illustrates the same, but with the main switch-board removed.
Figure 3:
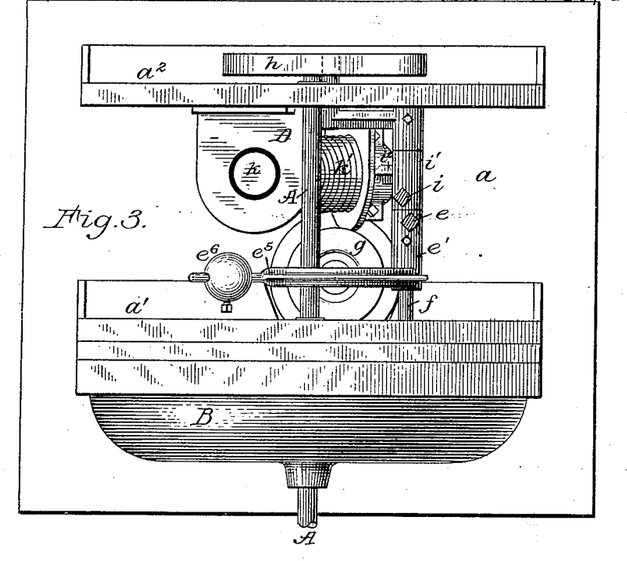
Fig. 3 is a plan view of the lower portion of the devices shown in Fig. 1.
Figure 4:
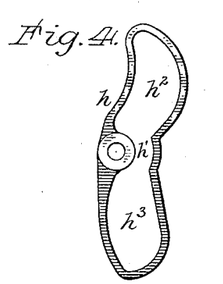
Fig. 4 is a side view of a cam by which the resistance-brushes are actuated, as from an elevator-car, said cam being shown in edge view in Figs. 1 and 3 and in dotted lines in Fig. 2.
Figure 5:
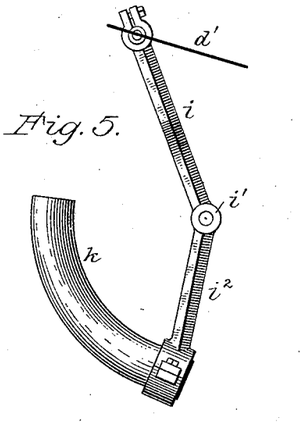
Figs. 5 and 6 illustrate one of the resistance-brushes detached, with its levers or arms, its axial sleeve, and the core of the solenoid, respectively, in side and front views.
Figure 6:
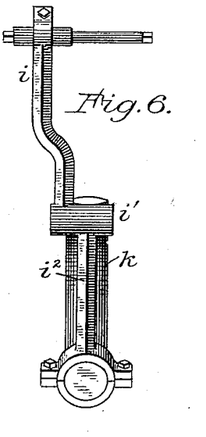
Figure 7:
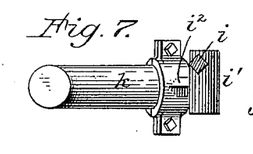
Fig. 7 is a plan view of the solenoid-core, its arm, and the axial sleeve, but without the brush and its arm.
Figure 12:
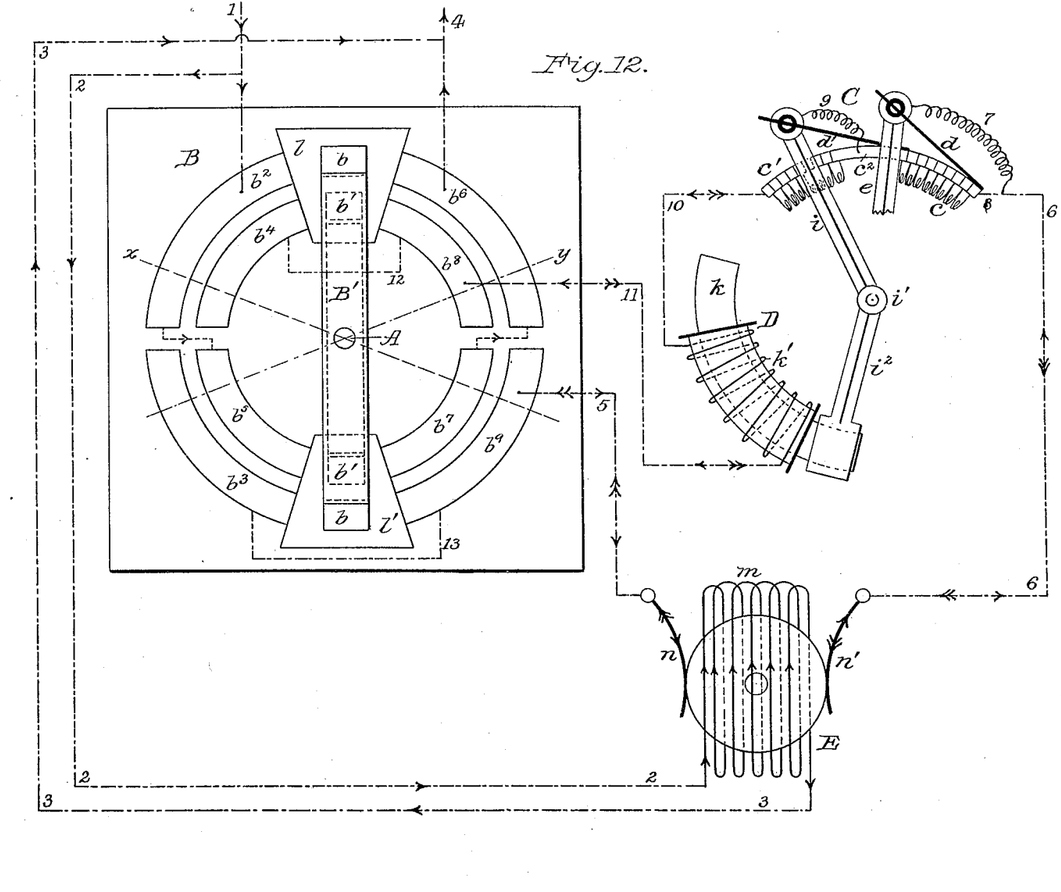
Fig. 12 is a diagrammatic illustration of the main switch, the rheostat with its two resistance brushes or switches, and the motor with appropriate electric connections.

Referring to Figs. 1, 2, and 3, it is to be understood that they illustrate the main portions of a switch-box as organized by me for use in electric elevators, the base $a$ and two vertical plates $a'$ and $a^2$ being indicated. On bearings in the two vertical frame-plates a main shaft A is mounted, and it is to be understood that said shaft is rocked or semirotated to and fro for starting and stopping and reversing the motor by any intervening means operatively accessible in or at the elevator-car. Upon this shaft a main switch-arm B' is secured, upon which are two brushes $b$ and $b'$, insulated from each other, (here shown to be resting on insulating-blocks,) but arranged, when in proper position, to engage with or sweep over appropriate contact-plates, as shown in Fig. 12, these parts constituting a main switch B in one of its simple forms for use with a reversible motor, as will be hereinafter more fully explained.

Attached to the inner side of the vertical frame-plate $a^2$ there is a novel rheostat C, in that it embodies two sets of resistance-blocks $c$ and $c'$, which at times operate as one set and at other times as separate sets, because each set is provided with its own sliding contact or resistance-brush $d$ or $d'$, and each of said brushes is automatically controlled while cutting out resistance.

I will first describe the brush $d$ and its retarder, this being a specially novel feature in the organization. The brush $d$ is carried upon an arm $e$, radiating from a sleeve $e'$, secured to a rock-shaft $f$, having its bearings in the vertical plates $a'$ $a^2$ and parallel with the main rock-shaft A. Another short arm $e^2$ radiates from said sleeve $e'$ in a direction opposite to that in which the brush $d$ extends from its arm $e$, and said short arm $e^2$ is connected by a link $e^3$ with a piston $e^4$ within a dash-pot $g$, the latter being shown in section in Fig. 11. A curved weight-arm $e^5$, provided at its outer end with a variably-adjustable weight $e^6$, projects from said sleeve $e'$ and overlies the short arm $e^2$. Now on referring to Fig. 11 it will be seen that the piston $e^4$ has a central ball-valve $e^7$, which is readily displaced or opened during the upward movement of the piston, but which renders the piston practically solid during its downward movement. It will also be seen that the barrel or chamber $g'$ of the dash-pot has a port $g^2$ at its top and another $g^3$ at its bottom, both communicating with a vertical duct or passage $g^4$, so that during the downward movement of the piston the fluid or the liquid contents of the pot (air, oil, glycerine, or mercury) will be caused to flow from the bottom to the top of said chamber, the descending movement of the piston (actuated by the weight $e^6$) being retarded or controlled in proportion to the rapidity of liquid or fluid displacement, and this may be graduated to any desired degree by means of a vent-cock at the lower port $g^3$, said cock in this case being a simple screw $g^5$ in a threaded hole through the wall of the dash-pot near its base.

Figure 11:
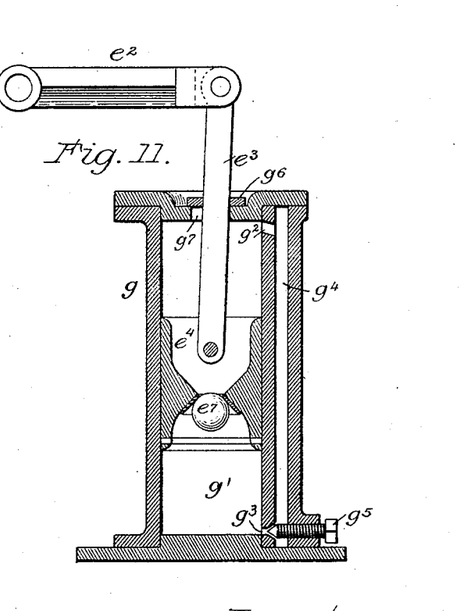
Fig. 11 in section illustrates the dash-pot retarder with its means by which its retarding capacity may be varied to meet exact requirements as to speed in the movement of the resistance-brush.

In order that dust and dirt may be excluded from the dash-pot, the link $e^3$ is loosely fitted with a washer, as at $g^6$, which always rests flatly on top of the dash-pot and overlies the opening $g^7$, in which the link or pitman $e^3$ reciprocates.

It will be now readily understood that whenever the brush $d$ has been swung into its initial (or full-resistance) position the weight $e^6$ is thereby elevated, and that when released and free to move the brush will travel over the resistance-blocks in "cutting out" only so fast as the descending piston in the dash-pot will permit.

When the motor is at rest, after having been operated in either direction, the brush $d$ is always mechanically swung into its said initial position by the shaft A, which at one end, outside of the vertical plate $a^2$, carries an open-rim cam $h$, having its working or operative surfaces extending each way from its center $h'$ and provided with open wings or spaces $h^2$ $h^3$ at each side of the center.

Figure 8:
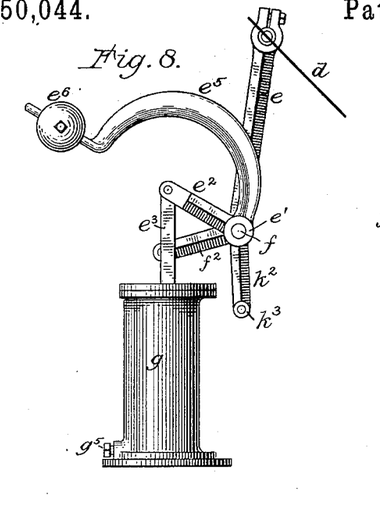
Figs. 8, 9, and 10 in side, front, and plan views, respectively, illustrate the other resistance-brush, its arm, and rock-shaft, and a retarder of the dash-pot type.
Figure 9:
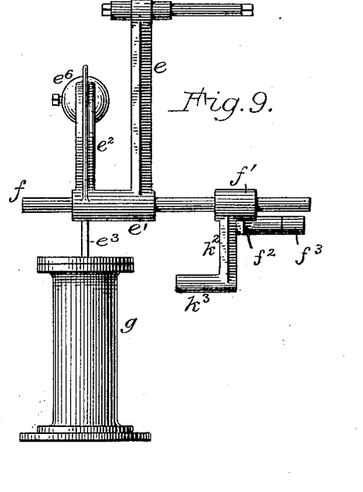
Figure 10:
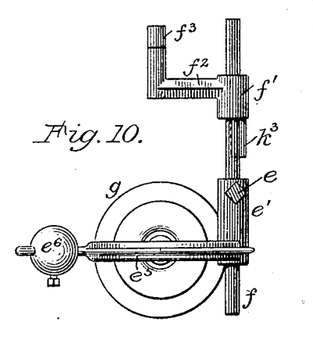

On the rock-shaft $f$, near the vertical plate $a^2$, there is a tight sleeve $f'$, (see Figs. 8, 9, and 10 for details,) provided with a radial arm $f^2$, from which a lateral stud carrying a roller $f^3$ projects through a hole $a^3$ in the plate $a^2$ (see Fig. 2) and occupies the interior of the cam $h$ on the shaft A, so that in whatever direction the cam may be rotated from its position of rest it will leave the brush $d$ free to be moved by gravitation under the control of the dash-pot retarder, and it will be seen that this combination of the brush $d$ and its retarder constitutes a complete automatic resistance cut-out, which can be used with a single set of resistance-blocks with good results, although the best results will accrue when employed with the second brush $d'$ and its solenoid-controller. This resistance-brush $d'$, separately considered, is organized substantially as disclosed in my Letters Patent aforesaid, it being, however, in this case carried on an arm $i$, radiating from a sleeve $i'$, loosely mounted on the rock-shaft $f$ and having a pendent arm $i^2$, which at its lower end carries a curved core $k$, so that the latter may move freely within the curved coil $k'$, said vibrative core and coil constituting the solenoid D. The core is so suspended with relation to the brush $d'$ that operating as a weight it normally holds the brush at its extreme rearward position, or, in other words, so that all of the resistances connected with the set of blocks $c'$ are cut out of the circuit; but when the core is wholly within the solenoid-coil all of that resistance is put into the circuit. In starting the motor the brush $d'$ is thrown forwardly by the rotation of the shaft A and the cam $h$, because the sleeve $f'$ has still another radiating arm $k^2$, provided with a laterally-projecting pin $k^3$, (see Fig. 9,) which engages with and crosswise of the pendent arm $i^2$ above the core $k$, as clearly indicated in Fig. 1. It will now be seen that the entire resistance is put in by both brushes $d$ and $d'$ whenever the switch is operated, as for stopping the motor, but that when released by the cam $h$ the brush $d$ proceeds to slowly and regularly move in cutting out the resistance at $c$, leaving the brush $d'$ under the control of the solenoid with reference to cutting out the resistance at $c'$.

Referring to Fig. 12, the electric connections will be next described. Here the main switch B and motor E are shown, with the rheostat C located at the one side of and sufficiently remote from the main switch to enable the electric connections to be clearly portrayed. In the position shown the main switch B has its switch-arm B' in an open-circuit position, with the motor at rest, the brushes $b$ and $b'$ resting on insulated blocks $l l$. There are eight segmental contact-plates in two concentric rows, the main-circuit terminal wires 1 and 4 connecting, respectively, with the upper outer plates $b^2$ and $b^6$, these two plates being respectively connected to the two inner lower plates $b^5$ and $b^7$. The terminal wires 5 and 11 of the motor-armature circuit are respectively coupled to an outer lower plate $b^9$ and an inner upper plate $b^8$, this latter connecting by way of wire 12 with the opposite upper inner plate $b^4$, the plates $b^9$ and $b^3$ being similarly connected by wire 13. The motor field-coils $m$ are in circuit with the main or feeding circuit wires 1 and 4 by way of the conductors 2 and 3, wholly outside of the main switch B; but it is to be understood that a cut-out switch is or may be also employed at the junction of the motor-circuit with the feeding-wires of the main circuit, and that said cut-out switch is operatively connected with the main switch, as disclosed in my aforesaid Letters Patent. At the rheostat C one terminal of the armature-circuit wire 6 connects by wire 8 with the outer or end block of the set $c$ of resistances, the last of this set connecting with the long intermediate block or plate $c^2$, which in turn is connected with the set $c'$ of resistances, the last or end block of which connects with the conductor 10. The resistance-brush $d$ is connected with the conductor 8 by a flexibly-ar ranged conductor 7, and the brush $d'$ is in like manner connected by wire 9 with the central block $c^2$. At the solenoid D the two terminals of the coil $k'$ connect with the conductors 10 and 11.

For starting and driving the motor in one direction the switch-arm B' will be moved so as to occupy the position indicated by the dotted line $x$. The current then entering by wire 1 to plate $b^2$ passes to plate $b^9$ by way of brush $b$, and thence out of the switch by way of wire 5 to one motor commutator-brush $n$, thence through the armature-winding to commutator-brush $n'$, out by wires 6 and 8 through the two sets of resistances $c\ c'$ to wire 10, and thence through the coil $k'$ of the solenoid and directly therefrom by wire 11 to the contact-plate $b^8$, across by wire 12 to plate $b^4$, across by brush $b'$ to plate $b^7$, to plate $b^6$, and thence out to the main-circuit wire 4. For starting and driving the motor in the opposite direction the switch-arm B' will be moved so as to occupy the position indicated by the dotted line $y$, whereupon the current entering at wire 1 passes through plate $b^2$ to plate $b^5$, thence by brush $b'$ to plate $b^8$, out on wire 11, through the solenoid-coil in the opposite direction, over wire 10 through the rheostat C to wire 6, to brush $n'$ of the motor, out at brush $n$ to wire 5, and thence to plate $b^9$, over wire 13 to plate $b^3$, and thence over brush $b$ to plate $b^6$, and out on wire 4. Before the brushes on the switch-arm B' reach the contact-plates in either direction the cam $h$ on shaft A still holds both of the resistance switch-brushes $d$ and $d'$ in their practically-inoperative position, the entire resistance then being in the armature-circuit. As soon, however, as the cam $h$, by the rotation of the switch-shaft A, reaches a certain position, both brushes $d$ and $d'$ are released. The brush $d$ then begins its automatic cutting-out operation because of the slow descent of its weight and the dash-pot piston, the electric current passing to or from the brush by way of the short-circuit wire 7, according to whether the current is entering the rheostat by way of wire 6 or wire 10. During this slow movement the set $c$ of resistances is gradually cut out until the brush $d$ bears upon the central long plate $c^2$, at which point that brush rests, having performed its allotted duty. The current after reaching said plate $c^2$ by way of wire 7 and brush $d$ must then pass through the set $c'$ of resistances until they are cut out gradually by the brush $d'$, which, as it passes over its resistance-blocks, progressively short-circuits them one by one, because of the wire 9, which connects the brush with the central plate $c^2$. At the outset the solenoid will at once release its core more or less; but this, while causing the movement of the brush $d'$, will at first cut out no resistance, because said brush bears upon and must first pass over the plate $c^2$ before it begins its cutting-out duty; but this duty will be performed in exact proportion to the increase of the counter electro-motive force in the armature-circuit and the consequent reduced flow of the current through the solenoid, and whenever said flow unduly increases more or less resistance will be put in by the solenoid automatically.

Figures 13, 14:
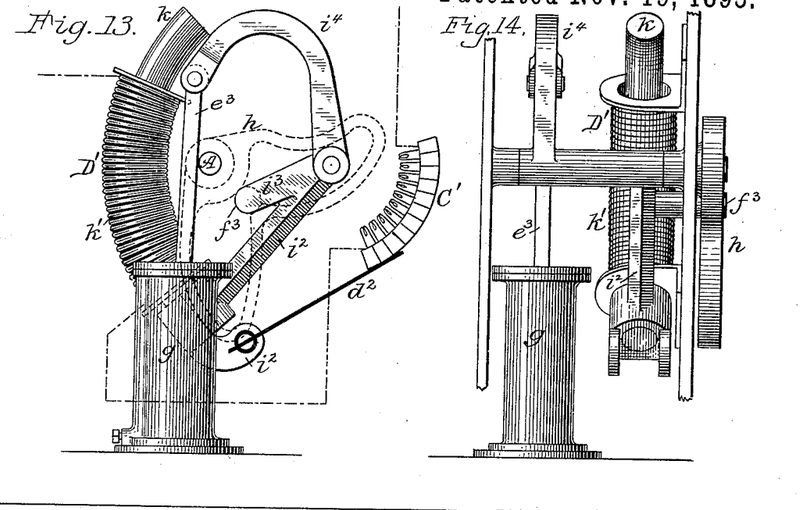
Figs. 13 and 14 in side and front views illustrate one portion of my invention as applied to a single resistance-brush which is controlled both by a mechanical retarder and a solenoid, the brush and resistance-blocks being omitted from Fig. 14.
Figure 15:
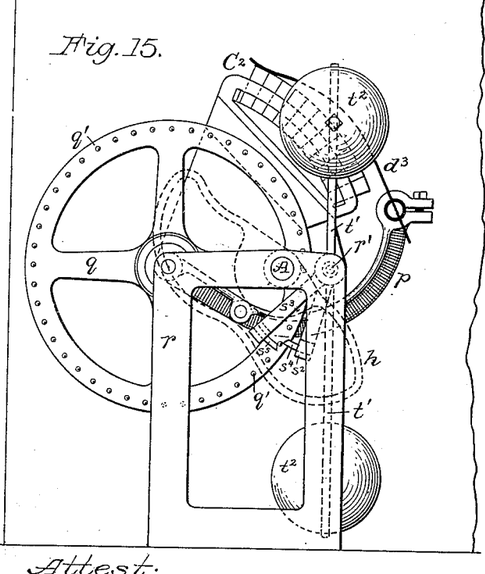
Figs. 15 and 16 in side and front views, respectively, illustrate a mechanically-controlled resistance-brush and a retarder of the escapement type.
Figure 16:
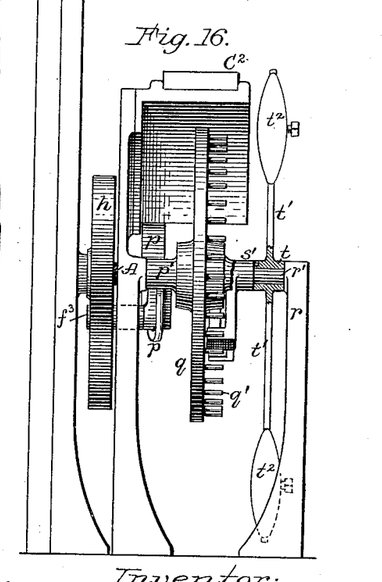
Figure 17:
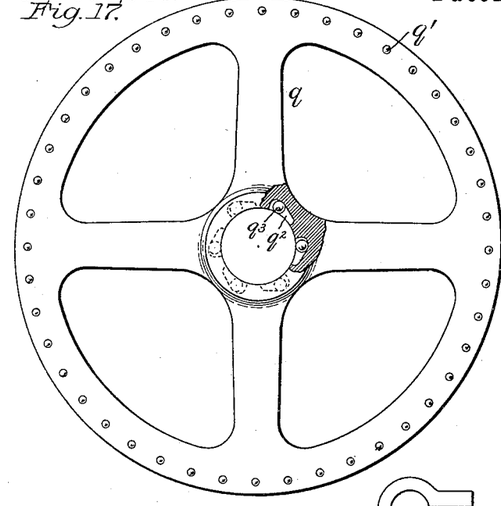
Figs. 17 and 18 are side and edge views of the escapement-wheel of the retarder.
Figure 18:
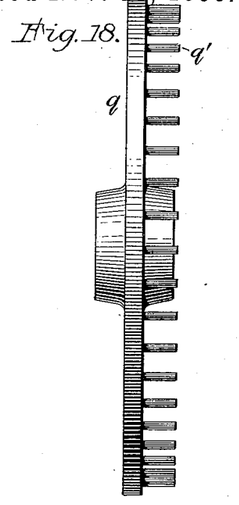

As hereinbefore indicated, a single resistance-brush can be controlled in part by a retarder and in part by a solenoid, in accordance with certain portions of my invention, and such an organization is illustrated in Figs. 13 and 14. In this instance the rheostat C' embodies one set of resistances and contact-blocks of uniform width. The solenoid D' is as before described, except that the core $k$ is longer and heavier, so that the coil $k'$ will have little or no control over it during a considerable proportion of its dropping or downward-swinging movement after it is released by the cam $h$, which, as before described, is mounted on the main-switch rock-shaft A. The brush $d^2$ is directly connected with the pendent arm $i^2$ and the latter has an integral arm $i^3$, provided with a lateral stud carrying a roller $f^3$, which occupies the interior of the cam $h$. The pendent arm $i^2$ radiates from a sleeve which is rotatively mounted and has at one end a goose-neck arm $i^4$, which projects in a direction opposite from the brush $d^2$ and overlies a dash-pot $g$, and is connected to the piston therein by a pitman or link $e^3$. With electric connections, as before described, and the shaft A, coupled to the reversing or main switch, this resistance-brush is controllable from an elevator-car like the other for putting in all of the resistance but when the brush is relieved by the cam $h$ the weight of the core causes the brush to at once commence its cutting-out duty, but independently of the control of the solenoid, the retarder causing the movement of the brush to be gradual and to cut out only as rapidly as may have been predetermined by the adjustment of the retarder. After a proper proportion of the resistance has been cut out the solenoid will then operate variably in accordance with the degree of eleectromotive force of the motor, sometimes allowing the core to drop still farther, and at other times putting in resistance, during which latter operation the retarder offers no obstruction and the brush may be moved promptly.

Figures 19, 20, 22:
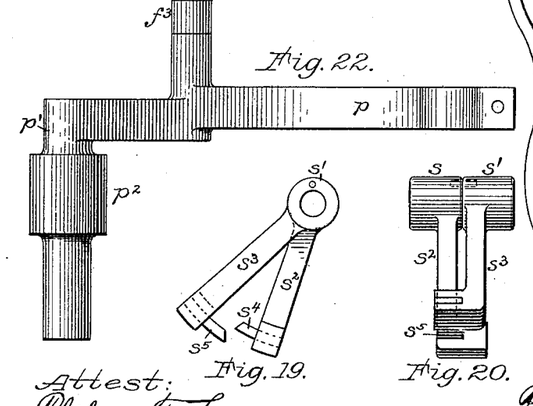
Figs. 19 and 20 in side and edge views illustrate the escapment-arm and the tappets which vibratively engage with and are engaged by appropriate pins or studs on the escapement-wheel.
Figs. 21 and 22 in side and tops views illustrate the brush-arm of said organization.
Figure 21:
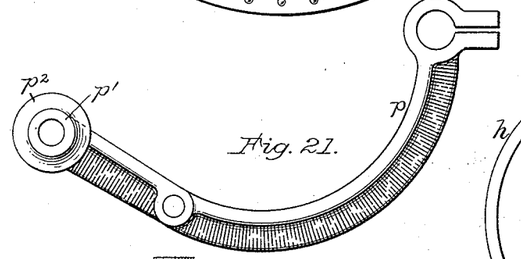
Figures 23, 24:
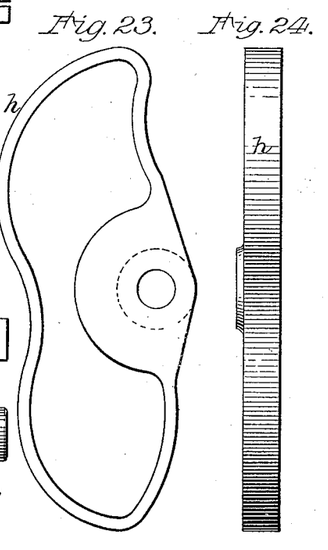
Figs. 23 and 24 in side and edge views illustrate the cam which sets the brush for putting in resistance.

Although retarders of the dash-pot type are specially reliable, simple in construction, and but little liable to derangement, it is to be understood that various other forms of retarder may be employed without departure from certain portions of my invention. Among such other forms I have found an escapement-retarder, as illustrated in Figs. 15 to 24, inclusive, to be very efficient. In this organization the brush $d^3$ is carried on a quite heavy arm $p$, which radiates from an axial sleeve $p'$, rotatively mounted on a fixed shaft but the sleeve has a circular hub $p^2$, which serves as a journal for a large light wheel $q$, provided at its rim with regularly-spaced lateral studs or pins $q'$. The hub of this escapement-wheel $q$ is internally chambered at several points to afford pockets $q^2$ for the reception of small steel balls $q^3$, which are held in place by the brush-arm hub $p^2$, so that said balls may freely roll on the periphery of the hub during the upward movement of the brush-arm. The inner or rear walls of the ball-chamber $q^2$ are, however, tangential to the surface of said hub, so that when the brush-arm is free to drop by its own weight said balls act as wedges and lock the brush-arms to the escapement-wheel, so that the latter is rotated to the extent of the downwardly-swinging movement of the brush-arm, which may, if needed, be extra weighted. The upward movement (or putting-in action) of the brush-arm is effected, as before described, by the rotation of the main-switch shaft A and the cam $h$, the latter in this instance acting upon the roller $f^3$, which is carried on a lateral stud projecting from the brush-arm $p$. For retarding the rotation of the wheel and the downward or cutting-out movement of the brush-arm, vibrating weighted escapement-levers are employed. Near the one edge of the escapement-wheel, on a standard $r$, there is a transverse stud $r'$, on which three connected sleeves $s$, $s'$, and $t$ are loosely mounted. The sleeves $s s'$ have each a radiating arm $s^2 s^3$, different in length, separated at their outer ends, as shown in Fig. 19, and provided with curved tappets or fingers $s^4 s^5$ in the same plane and having inclined faces at their ends, the latter being so spaced and arranged with relation to each other and to the plane traveled by the pins or studs $q'$ on the wheel $q$ that each pin in passing between said tappets will first pass over the inclined face of one tappet $s^4$ and then over the face of the other tappet $s^5$. The sleeve $t$ has two opposite radiating arms $t' t'$, on each of which there is a slidable weight $t^2 t^2$, provided with clamp-screws, so that they may be adjusted on their arms for varying the speed of their vibration when actuated by the escapement-wheel and arms or levers, thus enabling the apparatus to be adjusted so that the brush will gradually cut out all of the resistance in any predetermined length of time. It will be seen that this form of retarder, as well as the dash-pot retarder, can be used in connection with a solenoid on the same brush or in combination with a second brush wholly controlled by a solenoid. A retarder of the fan type can be readily provided by, for instance, employing a fine-toothed gear in place of the escapement-wheel and in place of the escapement-levers having a small pinion meshing with said gear, the pinion being mounted loosely on a stud and attached to a fan preferably having wings specially adapted to forcibly engage with the air—as, for instance, of the cup-shaped variety. If the periphery of the wheel should be smooth and have a delicately-adjustable brake-shoe applied thereto, an operative retarder would be afforded, although it would be liable to variable operation on account of the possible defilement of the braking surface, as by rust, dirt, dust, or oil, and for that reason either of the other forms of retarder described should be employed.

The obvious possible variations in speed which can be secured by differently adjusting two or more retarders of the same type or of different types will enable two brushes or more to be employed in connection with rheostats divided into two or more divisions, so that each brush in its regular order may cut out its own proportion of resistance, although the best results will accrue in having a part of the resistance automatically controlled by the electric current, as by the use of the solenoid.

Having thus described my invention, I claim as new and desire to secure by Letters Patent—

1. For use in an electric motor circuit, the combination substantially as hereinbefore described, of a rheostat provided with a series of contact blocks, and with a mechanically operated brush, which is moved automatically in one direction at a predetermined slow speed for gradually cutting out resistance, and a switch which controls the supply and reversal of electric current to the motor circuit, and has its arm mounted on a rock shaft which is operatively connected with said brush by means of a cam and moves said brush in the opposite direction for putting in resistance, preparatory to stopping a motor, and which on starting, releases said brush to the control of its automatic operating mechanism.

2. In an electric motor circuit, the combination substantially as hereinbefore described, of a rheostat provided with a series of contact blocks; an electro magnetically controlled brush which automatically sweeps to and fro over a portion of said blocks in cutting out, and putting in resistance, and a second automatic but mechanically operated and controlled brush, which sweeps over another portion of said blocks for cutting out resistance independently of the other brush.

3. A rheostat having two connected sets of contact blocks, in combination with two separate brushes, one in advance of the other, and each in cutting out resistance sweeping over its appropriate portion of said blocks independently of the other, substantially as described.

4. In an electric motor circuit, the combination substantially as hereinbefore described, of a rheostat having a series of contact blocks; separate brushes, each independently and automatically moved in one direction, in cutting out resistance, and a switch which controls the supply of electric current to a motor circuit, and also mechanically moves said brushes in the other direction, for putting in resistance, as when stopping a motor.

5. The combination substantially as hereinbefore described, of a switch having a switch arm mounted on a rock shaft, a rheostat containing a series of contact blocks; a brush mechanically actuated by way of said rock shaft, and operated by gravitation in sweeping over said blocks for cutting out resistance, and a dash pot having a piston connected to said brush, which operates as a retarder for securing a gradual slow cutting out movement by the brush, without obstructing its movement in the opposite direction.

6. The combination substantially as hereinbefore described, of an electric motor; a switch reversibly controlling the supply of electric current to the motor circuit; a rheostat in the motor armature circuit provided with a series of contact blocks, and having a brush, engaging with said blocks, which is actuated by the movement of the arm of said switch regardless of its direction of movement for putting in resistance, and is mechanically actuated and self controlled for gradually cutting out resistance, independently of both said switch and the electric current.

RUDOLF EICKEMEYER.

Witnesses:
STEPHEN D. FIELD,
CHAS. P. STEINMETZ.